(12) United States Patent
Minei et al.

(10) Patent No.: US 7,558,199 B1
(45) Date of Patent: Jul. 7, 2009

(54) RSVP-PASSIVE INTERFACES FOR TRAFFIC ENGINEERING PEERING LINKS IN MPLS NETWORKS

(75) Inventors: Ina Minei, Santa Clara, CA (US);
Der-Hwa Gan, Fremont, CA (US);
Pedro R. Marques, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 898 days.

(21) Appl. No.: 10/973,677

(22) Filed: Oct. 26, 2004

(51) Int. Cl.
*H04L 12/26* (2006.01)
(52) U.S. Cl. .................. 370/230; 370/468; 370/252
(58) Field of Classification Search .............. 370/230, 370/234, 235, 252, 351, 395.2, 395.21, 401, 370/468
See application file for complete search history.

(56) References Cited

U.S. PATENT DOCUMENTS

| | | | |
|---|---|---|---|
| 6,363,319 B1 * | 3/2002 | Hsu | 701/202 |
| 6,538,416 B1 * | 3/2003 | Hahne et al. | 370/431 |
| 6,956,821 B2 | 10/2005 | Szviatovszki et al. | |
| 7,031,312 B1 | 4/2006 | Jayakumar et al. | |
| 7,039,706 B1 * | 5/2006 | Parker et al. | 709/226 |
| 7,065,084 B2 | 6/2006 | Seo | |
| 7,082,102 B1 | 7/2006 | Wright | |
| 7,164,679 B2 * | 1/2007 | Kotha et al. | 370/392 |
| 7,317,731 B2 | 1/2008 | Seddigh et al. | |
| 7,336,617 B1 | 2/2008 | Liu | |
| 7,477,657 B1 * | 1/2009 | Murphy et al. | 370/468 |
| 7,489,695 B1 * | 2/2009 | Ayyangar | 370/396 |
| 2003/0028670 A1 | 2/2003 | Lee et al. | |
| 2003/0028818 A1 | 2/2003 | Fujita | |
| 2003/0103510 A1 * | 6/2003 | Svanberg et al. | 370/395.2 |
| 2003/0108051 A1 | 6/2003 | Bryden et al. | |
| 2003/0117950 A1 | 6/2003 | Huang | |
| 2003/0137971 A1 | 7/2003 | Gibson et al. | |
| 2003/0210705 A1 | 11/2003 | Seddigh et al. | |
| 2004/0004955 A1 | 1/2004 | Lewis | |
| 2004/0010617 A1 * | 1/2004 | Akahane et al. | 709/243 |
| 2004/0042398 A1 | 3/2004 | Peleg et al. | |
| 2005/0010685 A1 | 1/2005 | Ramnath et al. | |
| 2005/0013242 A1 | 1/2005 | Chen et al. | |
| 2005/0125490 A1 | 6/2005 | Ramia | |
| 2005/0169270 A1 | 8/2005 | Mutou et al. | |
| 2005/0169313 A1 * | 8/2005 | Okamura et al. | 370/477 |
| 2005/0259586 A1 * | 11/2005 | Hafid et al. | 370/241 |
| 2005/0265258 A1 * | 12/2005 | Kodialam et al. | 370/254 |

(Continued)

OTHER PUBLICATIONS

D. Awduche et al., "RFC 3209—RSVP-TE: Extensions to RSVP for LSP Tunnels," Network Working Group, Dec. 2001, 47 pgs.

(Continued)

*Primary Examiner*—Kwang B Yao
*Assistant Examiner*—Nguyen Ngo
(74) *Attorney, Agent, or Firm*—Shumaker & Sieffert, P.A.

(57) ABSTRACT

Constraint information associated with peering links is taken into account when establishing label switched paths (LSPs) to exit points of a network. Devices within the network, such as routers, designate interfaces associated with peering links as "passive interfaces" to indicate that the interfaces should be included for bandwidth accounting purposes and internal path computation. Other devices within the network utilize the constraint information, e.g., bandwidth availability, when computing and establishing LSPs to the exit points of the network to avoid congested peering links.

38 Claims, 8 Drawing Sheets

U.S. PATENT DOCUMENTS

| | | | |
|---|---|---|---|
| 2006/0013232 A1 | 1/2006 | Xu et al. | |
| 2006/0039364 A1 | 2/2006 | Wright | |
| 2006/0039391 A1 | 2/2006 | Vasseur et al. | |
| 2006/0126536 A1 | 6/2006 | Patel et al. | |
| 2006/0182119 A1 | 8/2006 | Li et al. | |
| 2006/0233137 A1 | 10/2006 | Dantu et al. | |
| 2007/0268909 A1* | 11/2007 | Chen et al. | 370/395.21 |

OTHER PUBLICATIONS

RSVP-TE: Resource Reservation Protocol—Traffic Extension, Javvin Company, 2 pgs, printed Feb. 14, 2005.

U.S. Appl. No. 10/860,183, entitled "Constraint-Based Label Switched Path Selection Within A Computer Network," filed Jun. 3, 2004.

U.S. Appl. No. 10/928,572, entitled "Traffic Engineering Using Extended Bandwidth Accounting Information," filed Aug. 27, 2004.

U.S. Appl. No. 10/963,412, entitled "Automatic LSP Stitching With Protocol Signaling," filed Oct. 12, 2004.

* cited by examiner

| LINK # | PASSIVE INTERFACE | MAX CAPACITY | PRIORITY [0] | PRIORITY [1] | ... | PRIORITY [7] |
|---|---|---|---|---|---|---|
| LINK 1 | N | 200 | 150 Mbps | 100 Mbps | | 100 Mbps |
| LINK 2 | N | 200 | 200 Mbps | 50 Mbps | | 50 Mbps |
| LINK 3 | N | 300 | 225 Mbps | 150 Mbps | | 100 Mbps |
| LINK 4 | N | 200 | 175 Mbps | 150 Mbps | | 150 Mbps |
| LINK 5 | Y | 300 | 200 Mbps | 127 Mbps | | 100 Mbps |

FIG. 3

RSVP-PASSIVE INTERFACES FOR TRAFFIC ENGINEERING PEERING LINKS IN MPLS NETWORKS

TECHNICAL FIELD

The invention relates to computer networks and, more particularly, engineering traffic within a network.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the network, routers exchange routing information in accordance with a defined routing protocol, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links.

The term "peering link" is used to refer to a link that connects devices, e.g., routers, located within separate networks, which are often under the control of separate administrative entities. As networks grow in size and complexity, the traffic on any given link, including peering links, may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System—Intermediate System (ISIS) protocol or the Open Shortest Path First (OSPF) protocol. RSVP-TE may use a modified version of the SPF algorithm, known as Constrained Shortest Path First (CSPF), to compute a shortest path that conforms to the specified constraints. In order to calculate such a path, information about these constraints must be available for each link, and must be distributed to all of the nodes that calculate paths. RSVP-TE may then set up an LSP along the path that it computed with CSPF.

One common implementation is to establish an LSP within a network for directing traffic along specific paths to exit points of that network. When selecting the path within the network, however, the interior routing protocol is generally unaware of links outside of the network. For example, peering links are often under the control of two administrative entities, and typically do not support MPLS. As a result, a problem may arise where the network has multiple exit points, but the selected shortest path terminates at an exit point with a congested peering link. In this situation, another exit point with sufficient bandwidth may have been preferable, but was not selected as no constraint information for the peering link was known.

SUMMARY

In general, techniques are described that account for constraint information associated with peering links when establishing label switched paths (LSPs) to exit points of a network. In other words, constraint information, such as bandwidth availability, is taken into account when performing path selection for the LSP. As a result, constraint information associated with peering links external to a network are considered when establishing LSPs to the exit points of the network.

A network device, such as a router, within the network utilizes the techniques to designate interfaces associated with peering links as "passive interfaces." In general, the term "passive interface" is used herein to refer to an interface for which protocol information associated with the link is advertised, but on which the associated protocol does not run. The network device may designate the interface associated with a peering link as, for example, "RSVP-passive" to indicate that the interface should be included for bandwidth accounting purpose and path computation even though the interface does not support bandwidth reservations via the Resource Reservation Protocol (RSVP).

The network device determines constraint information, e.g., bandwidth availability information, for the peering links associated with the passive interfaces, and advertises the constraint information via an interior routing protocol. Other devices within the network utilize the constraint information associated with the peering links when establishing LSPs to exit points of the network. In this manner, traffic-engineering efforts are not frustrated by congestion on links external to the network, for which MPLS or resource reservation protocols are unsupported.

In one embodiment, a method comprises designating an interface associated with a peering link as a passive interface for which bandwidth reservations are unsupported. The method further comprises calculating an amount of bandwidth available for the peering link, and outputting a communication to communicate the amount of bandwidth available on the peering link.

In another embodiment, a device comprises a resource reservation protocol executing within a control unit to collect constraint information associated with a peering link for which the reservation requests are unsupported. A routing protocol executing within the control unit communicates the constraint information to other devices of a network.

In another embodiment, a computer-readable medium contains instructions. The instructions cause a network device to execute a first protocol that designates an interface associated with a peering link as a passive interface on which the first protocol is unsupported. The first protocol calculates constraint information for the peering link. The instructions cause the network device to execute a second protocol that outputs a communication to communicate the constraint information.

In another embodiment, a method comprises executing a routing protocol within a network device to receive constraint information for a peering link associated with an exit point of a network. The method further comprises computing a path within the network based on the received constraint information.

In another embodiment, a device comprises a routing protocol executing within a control unit, wherein the routing protocol receives constraint information for a peering link of a network and computes a path that terminates within the network based on the constraint information for the peering link.

In another embodiment, a computer-readable medium comprises instructions that cause a processor to execute a first protocol to receive constraint information for one or more peering links associated with a network and compute a path that terminates at an egress of the networks based on the received constraint information associated for the peering links. The instructions cause the processor to execute a second protocol to establish a label switched path to the egress in accordance with the computed path.

In another embodiment, a method comprises invoking an offline software tool to compute a path to an exit point of a network based on the constraint information for a peering link associated with the exit point. The method further comprises manually establishing an LSP in accordance with the path computed by the offline software tool.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a block diagram illustrating an exemplary traffic engineering data structure maintained by the router of FIG. 2.

DETAILED DESCRIPTION

Figure 1:
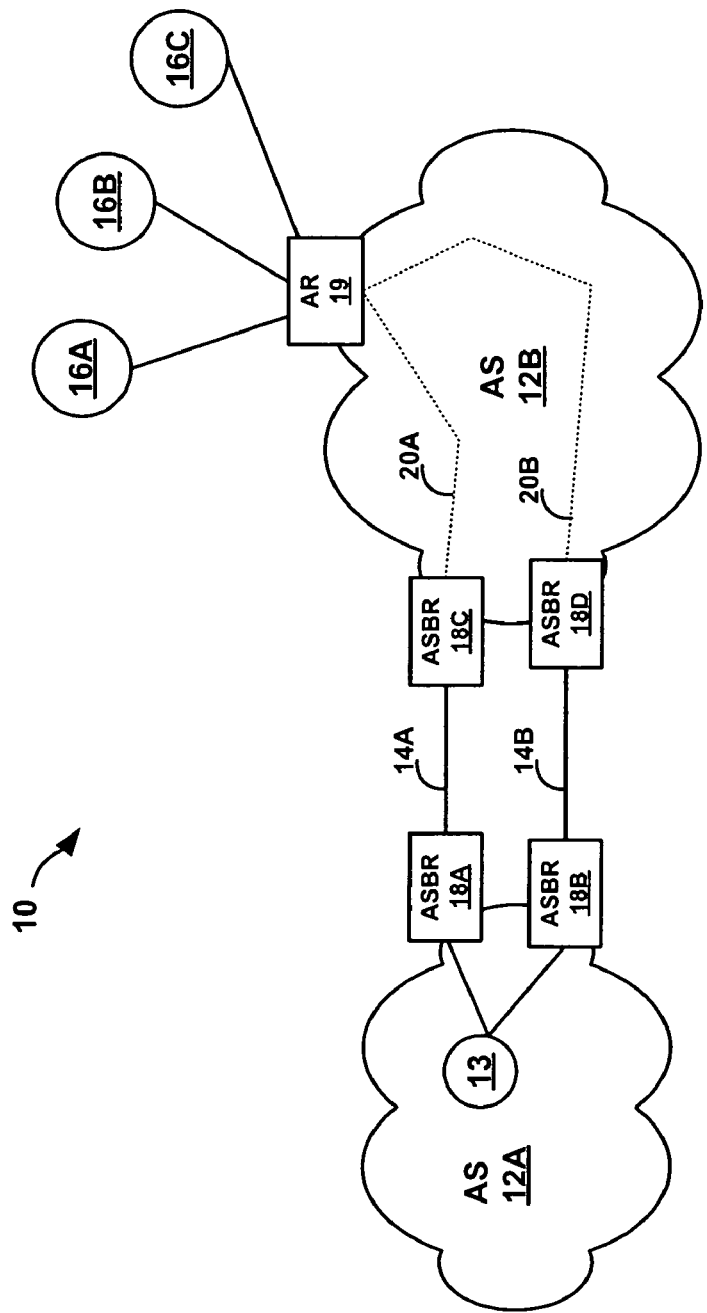
FIG. 1 is a block diagram illustrating an exemplary system that account for constraint information associated with peering links when establishing label switched paths (LSPs) to exit points of a network.

FIG. 1 is a block diagram illustrating an exemplary system 10 that includes an autonomous system (AS) 12A and AS 12B. In this example, AS 12A and AS 12B are connected by peering links 14A and 14B (collectively, "peering links 14"), and are each owned by separate administrative entities. Each of AS 12A and AS 12B executes an interior gateway protocol (IGP), such as the Intermediate System—Intermediate System (ISIS) protocol or the Open Shortest Path First (OSPF) protocol.

Application server 13 resides in AS 12A, and provides services to customers 16A-16C (collectively, "customers 16"). For example, application server 13 may provide network Internet Protocol (IP) telephony, video conferencing, multimedia delivery, Video on Demand (VoD), Video-Surveillance, Voice over Internet Protocol (VoIP), IP-TV, gaming networks or other services.

In order to control the delivery of services, AS 12A includes label switched paths (LSPs) 20A-20B (collectively, "LSPs 20") defined between access router (AR) 19 and autonomous system border router (ASBR) 18C and ASBR 18D, respectively. In this example, AS 12B runs the Multi-protocol Label Switching protocol (MPLS), and utilizes RSVP-TE as a label distribution protocol. Network traffic associated with the services provided by application server 13 flow between the application server and customers 16 via LSPs 20, and the LSPs terminate at exit points of AS 12B, i.e., ASBR 18C, ASBR 18D and AR 19.

In accordance with the principles described herein, the IGP and RSVP-TE protocols operating within AS 12B have been extended to account for constraint information associated with peering links 14 when establishing one or more of LSPs 20. For example, ASBR 18C and ASBR 18D execute an extended version of RSVP-TE that allows interfaces associated with peering links 14A and 14B to be designated as "RSVP-passive" interfaces. In general, the term "passive interface" is used herein to refer to an interface for which protocol information associated with the link is advertised, but on which the associated protocols do not run. ASBRs 18C and 18D designate the interfaces associated with peering links 14 as RSVP-passive to indicate that the interfaces should be included for bandwidth accounting and path computation purposes even though the interfaces do not run the MPLS protocol or support the Resource Reservation Protocol (RSVP), i.e., bandwidth reservations are unsupported.

As a result, RSVP-TE executing on ASBRs 18C and 18D collect constraint information, e.g., bandwidth availability information, for peering links 14A and 14B, respectively, as well as other links internal to AS 12B. IGP executing on ASBRs 18C and 18D output routing communications that advertise the constraint information to other routers within AS 12B as link-state information. Because the interfaces to peering links 14A and 14B have been identified as RSVP-passive interfaces, the respective IGP routing communications issued by ASBR 18C and ASBR 18D specify the accumulated bandwidth availability information for peering links 14A and 14B as link-state information.

Devices within AS 12B, such as AR 19, receive the IGP routing communications and update internal routing information. In addition, RSVP-TE running on AR 19 performs constraint-based path computation in accordance with the principles of the invention to identify and select one of LSPs 20 for directing traffic through AS 12B to AS 12A. For example, AR 19 utilizes a modified Constrained Shortest Path First (CSPF) process to calculate the shortest path across AS 12B that satisfies a specified constraint. In making this decision, AR 19 includes in the calculation the available bandwidth of peering links 14 accumulated and advertised by ASBR 18C and 18D.

In this way, AR 19 may compute one of LSPs 20 that leads to a non-congested or least-congested one of peering links 14.

For example, if peering link 14B has sufficient available bandwidth, but peering link 14A does not, the modified CSPF process executing on AR 19 selects ASBR 18D as the exit point to AS 12A and computes LSP 20B as the shortest constrained path. If LSP 20B has not yet been previously established, the extended version of RSVP-TE establishes the new path, LSP 20B, through AS 12B to terminate on ASBR 18D.

For purposes of bandwidth accounting, ASBRs 18C and 18D treat peering links 14 as though they support MPLS forwarding, i.e., as if LSPs 20 actually extended through peering links 14. However, LSPs 20 do not extend through peering links 14 in this situation, since MPLS forwarding and the exchange of RSVP-TE messages are not supported on peering links 14, as is typical with peering links that couple two different administrative domains.

As a result, AS 12B may be better able to provide a guaranteed or desired level of service to customers 16 in that congestion on peering links 14A and 14B is accounted for when selecting exit points from AS 12B and, in particular, computing one or more of LSPs 20. One effect on customers 16 may be that a customer will receive the requested network service only if there is sufficient available bandwidth on peering links 14. If not, service may not be initiated. It is often considered preferable for customers 16 to receive none of the services at all than to be accepted for service and then receive unacceptable quality of service (QoS).

In this manner, the RSVP-TE and IGP protocols implemented by devices within AS 12B not only account for and utilize the bandwidth accounting information for links within AS 12B, but also bandwidth accounting information for peering links 14 that often do not support these protocols. Although discussed in terms of bandwidth, the techniques can be applied to other constraints associated with peering links 14, such as administrative attributes or the priority of other LSPs having traffic that will cross peering links 14.

In one embodiment, the path computation may be performed by an "offline" path computation software tool instead of by AR 19. For example, such an offline software tool may receive as input information about a network including constraint information associated with peering links. This input may be received from a configuration file or directly from a device associated with the network. Based on the information received, the offline software tool computes a path that satisfies constraints, and outputs the computed path. A system administrator receives the output and manually establishes LSPs in accordance with the computed path. The software tool is referred to as "offline" in that the software tool is not executed by a device integral to the network.

Figure 2:
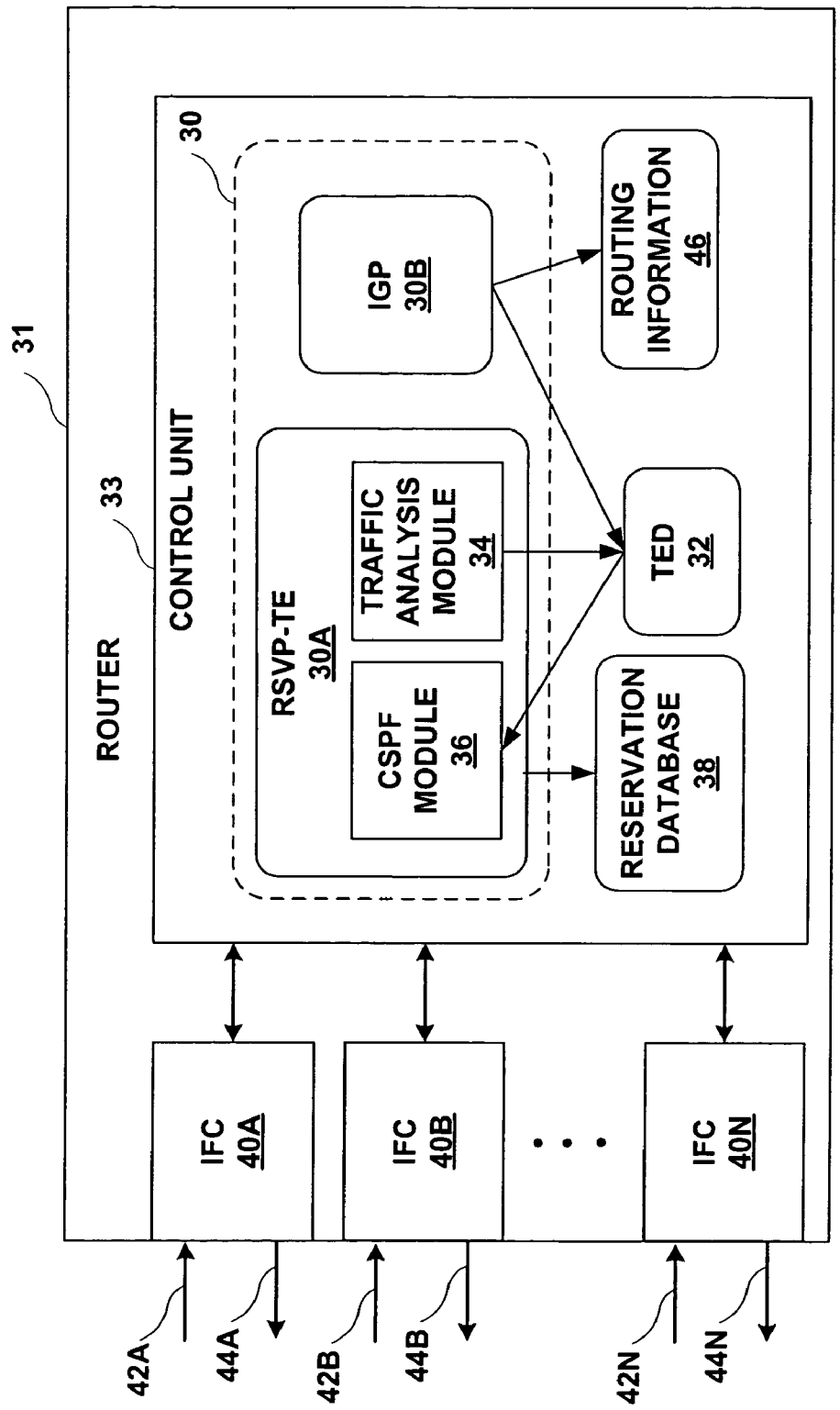
FIG. 2 is a block diagram illustrating an exemplary router that supports "passive RSVP" interfaces to account for constraint information associated with peering links.

FIG. 2 is a block diagram illustrating an exemplary router 31 that supports "passive RSVP" interfaces to account for constraint information associated with peering links. Router 31 may, for example, represent any of ASBRs 18A-18D or AR 19 of FIG. 1.

In the example embodiment of FIG. 2, router 31 includes a set of interface cards (IFCs) 40A-40N (collectively, "IFCs 40") for communicating packets via inbound links 42A-42N (collectively, "inbound links 42") and outbound links 44A-44N (collectively, "outbound links 44"). Router 31 further comprises a control unit 33 that maintains routing information 46. In general, when router 31 receives a packet via one of inbound links 42, control unit 33 determines a destination and associated next hop for the packet in accordance with routing information 46 and forwards the packet on an outbound link 44 based on the destination or on the label that the packet carries. Routing information 46 describes the topology of a network, such as AS 12B of FIG. 1, and, in particular, routes through the AS. Routing information 46 may include, for example, route data that describes various routes within a network and corresponding next hop data indicating appropriate neighboring devices within the network for each of the routes, as well as labels that will be applied to the traffic. Router 31 receives routing communications from other routers, and updates routing information 46 to accurately reflect the topology of the network in accordance with the routing communications. Each of the routing communication conforms to a routing protocol, such as an IGP or an external gateway protocol (EGP), or to a label distribution protocol, such as LDP or RSVP-TE.

Control unit 33 provides an operating environment for protocols 30A-30B (collectively, "protocols 30") executing within control unit 33. In this example, protocols 30 include a resource reservation protocol 30A ("RSVP-TE 30A") and an interior gateway protocol 30B ("IGP 30B"), such as OSPF or IS-IS. RSVP-TE 30A receives resource reservation requests from other routing devices, and reserves the requested bandwidth on outbound links 44 for RSVP-TE traffic. RSVP-TE 30A tracks the bandwidth reservation requests in order to maintain accurate bandwidth availability information. RSVP-TE 30A may, for example, receive a reservation request to reserve 100 Mbps of bandwidth in association with a particular network path. If available, RSVP-TE 30A reserves that bandwidth on the appropriate one of outbound links 44, and records that reservation in reservation database 38 for use in processing future reservation requests to avoid reserving excess bandwidth on any given one of outbound links 44. Although described for exemplary purposes in reference to RSVP-TE, the principles described herein may by applied to extend any similar protocol, such as a different constraint-based routing protocol.

Further, RSVP-TE 30A calculates the amount of bandwidth available on one or more outbound links 44 using the reservation requests stored in reservation database 38. In accordance with the principles of the invention, RSVP-TE 30A may identify one or more of outbound links 44 as peering links, and may designate interfaces associated with the peering links as RSVP-passive interfaces. As a result, RSVP-TE 30A performs bandwidth accounting for the designated peering links even though the peering links and, more specifically, the interfaces associated with the peering links do not support RSVP. The identification of peering links may be done manually, e.g., with a system administrator flagging the peering links. Alternatively, RSVP-TE 30A may automatically calculate available bandwidth for all links running external BGP (EBGP) sessions.

In some embodiments, RSVP-TE 30A includes a traffic analysis module 34 that monitors traffic on outbound links 44 that is not associated with reserved bandwidth (e.g., LDP or IP traffic). Traffic analysis module 34 calculates the available bandwidth for a given one of outbound links 44 using statistics for current consumption of unreserved bandwidth as well as reservation data from reservation database 38. For example, for a peering link, traffic analysis module 24 may average unreserved bandwidth utilized by traffic on a given one of outbound links 44 over a period of time, and subtract the calculated average bandwidth usage from a total capacity of the link.

In this manner, RSVP-TE 30A may account for both the amount of bandwidth reserved for RSVP-TE traffic and the amount of unreserved bandwidth (e.g., LDP or other traffic) currently being consumed on each of outbound links 44. These techniques are further described in Ser. No. 10/928,572, entitled "Traffic Engineering Using Extended Bandwidth Accounting Information," filed on Aug. 27, 2004, the entire content of which is herein incorporated by reference. RSVP-TE 30A stores the bandwidth availability information in a traffic engineering data structure 32 ("TED 32"), which may be a database or other suitable data structure.

Router 31 advertises the bandwidth availability information to other routing devices as link-state information via a routing protocol, such as IGP 30B. In particular, IGP 30B outputs routing communications that conform to the routing protocol and convey the bandwidth availability information for outbound links 44, including any peering links, as link-state information. Moreover, IGP 30B outputs the routing communications to identify any peering links that have been associated with RSVP-passive interfaces, thereby allowing the receiving router to account for the peering links when performing path computation. In addition, router 31 receives bandwidth availability information from other routing devices via a routing protocol, such as IGP 30B, and stores the bandwidth availability information within TED 32.

For example, IGP 30B may similarly receive bandwidth availability information from the other routing devices via IGP routing communications. In response, IGP 30B updates TED 32 with the received bandwidth availability information. In this manner, router 31 maintains accurate bandwidth availability information for links associated with a network, including peering links associated with exit points of the network.

Consequently, CSPF module 36 of RSVP-TE 30A may utilize the bandwidth availability information, including the bandwidth availability information for peering links, when performing path computation. In general, the CSPF module is responsible for computing shortest paths to next hops associated with some network destination, where the shortest path satisfies certain constraints. During this process, CSPF module 36 may consider the bandwidth availability information of TED 32 when making the computation, and may factor in the bandwidth availability of any peering link through which traffic would exit the network even though the peering link does not necessarily fall along the internal path. For example, using the techniques, CSPF module 36 executing within AR 19 (FIG. 1) utilizes bandwidth availability information for each of peering links 14 when computing and establishing one or more of LSPs 20 for reaching exits points of AS 12B, i.e., ASBR 18C or ASBR 18D. When establishing a new path, control unit 33, or a system administrator, invokes RSVP-TE 30A to traffic engineer the computed shortest path and establish the LSP.

In some embodiments, TED 32 may include data indicative of which other routers in the network support the techniques described herein and, in particular, whether the accounting information received from the routers includes peering links and accounts for traffic associated with unreserved resources as well as reserved bandwidth. In this manner, router 31 can identify which bandwidth availability information was calculated by routers supporting the capability to account for peering links in its bandwidth availability calculations. If the bandwidth availability information received from a router does not support the techniques described herein, CSPF module 36 may ignore the bandwidth availability information when computing paths that satisfy a requested bandwidth requirement. Alternatively, in mixed environments where only a subset of routers support the techniques described herein, router 31 may use the bandwidth availability information from the supporting routers to the extent possible to avoid congested peering links.

Although described in reference to RSVP-TE, the techniques may be applied to other resource reservation protocols, constraint-based routing protocols, or QoS signaling methods, such as protocols from the Next Steps in Signaling (NSIS) working group of the Internet Engineering Task Force (IETF). Furthermore, although described in reference to IGP, the techniques for advertising the bandwidth availability information associated with peering links may be performed by other routing protocols capable of communicating (or which can be extended to communicate) the accounting information.

Although illustrated in FIG. 2 as a part of router 31, in some embodiments traffic analysis module 34 may execute within a separate device. In that case, router 31 may receive traffic statistics from the external traffic analysis module for optional storage. Alternatively, router 31 may simply request traffic statistics from the external traffic analysis module when needed to compute bandwidth availability information.

The architecture of router 31 illustrated in FIG. 2 is shown for exemplary purposes only. In other embodiments, router 31 may be configured in a variety of ways. In one embodiment, for example, control unit 33 and its corresponding functionality may be distributed within IFCs 40. In another embodiment, control unit 33 may include a routing engine that performs route resolution and maintains a routing information base (RIB), e.g., routing information 46, and a forwarding engine that performs packet forwarding based on a forwarding information base (FIB) generated in accordance with the RIB.

Control unit 33 may be implemented solely in software, or hardware, or may be implemented as a combination of software, hardware, or firmware. For example, control unit 33 may include one or more processors which execute software instructions. In that case, the various software modules of control unit 33, such as protocols 30, may comprise executable instructions stored on a computer-readable medium, such as computer memory or hard disk.

FIG. 3 is a block diagram illustrating an exemplary TED 32 maintained by router 31 (FIG. 2). As described above, a resource reservation protocol, such as RSVP-TE 30A, generates traffic engineering data structure 32 to include bandwidth availability information for links, including peering links that have been associated with RSVP-passive interfaces. As illustrated, the techniques may be used to provide extended accounting information when the resource reservation protocol supports priority levels and, in particular, the assignment of priorities to different LSPs.

In the exemplary embodiment illustrated in FIG. 3, TED 32 is shown as a table in which each row represents a particular link (FIG. 2) within a network. For each link, TED 32 may include an indicator 52 of whether or not that particular link has been associated with a passive interface, e.g., an RSVP-passive interface. In this example, link 5 is designated as being associated with a passive interface. In addition, each row of TED 32 includes a maximum traffic capacity of the link and a currently available bandwidth capacity for each level of priority, e.g., priority levels 0-7. For links associated with passive interfaces, e.g., link 5, TED 32 maintains bandwidth accounting for different priority levels as if the link supported LSPs.

In some embodiments, TED 32 may also include an indicator (not shown) of whether or not a corresponding router that performed the bandwidth availability calculations for that particular link supports the extended bandwidth accounting and use of passive interfaces as described herein. In these embodiments, the resource reservation protocol may account for traffic associated with unreserved resources as the highest priority due to the fact that this traffic cannot be routed.

Figure 4:
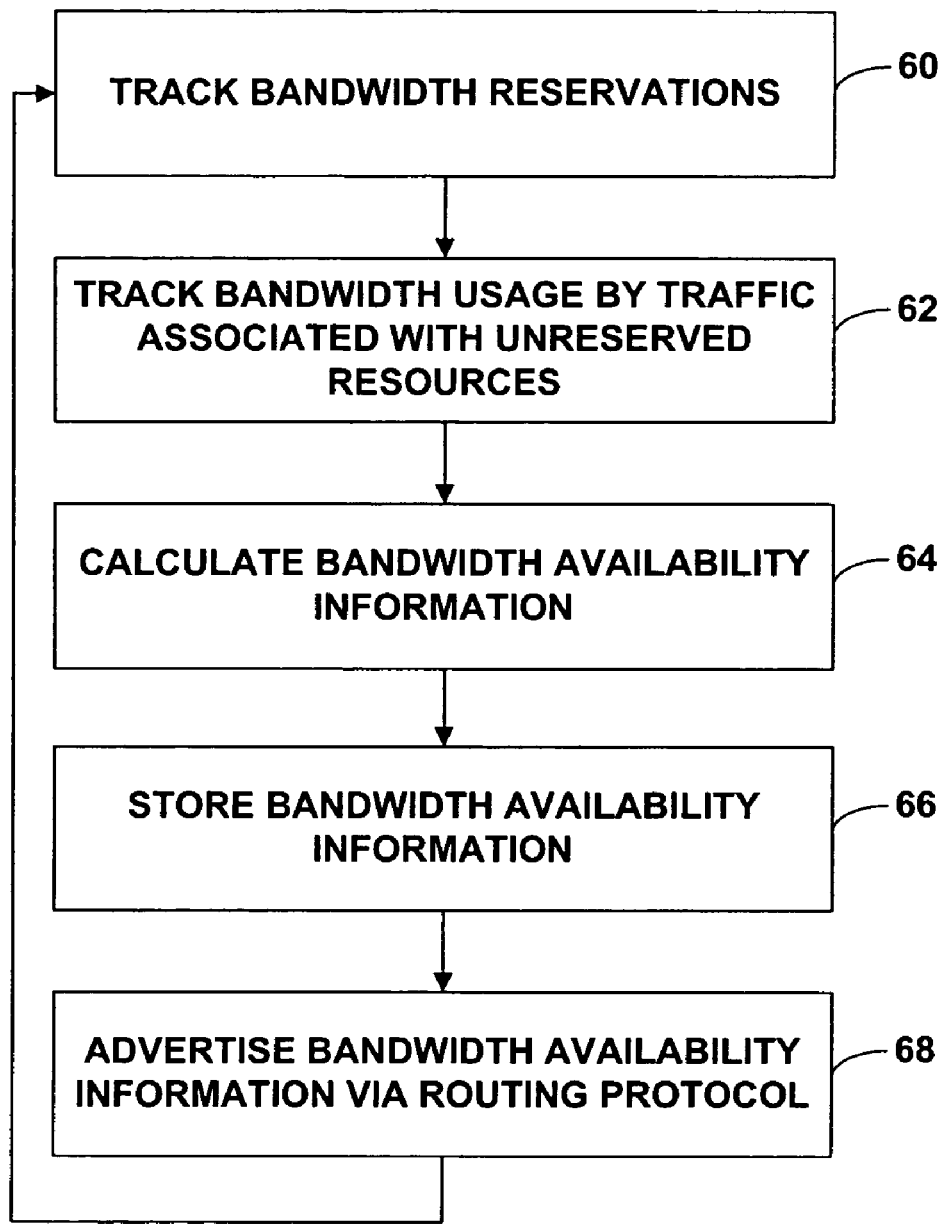
FIG. 4 is a flow diagram illustrating exemplary operation of a router that accounts for and advertises bandwidth availability of peering links associated with passive interfaces.

FIG. 4 is a flow chart illustrating example operation of a router, such as router 31 of FIG. 2, that accounts for and advertises bandwidth availability of peering links associated with passive interfaces. Initially, router 31 tracks the amount of bandwidth reserved on each of outbound links 44 (60). Router 31 may, for example, maintain a reservation database, e.g., reservation database 38, that indicates the amount of bandwidth reserved for each of outbound links 44.

Router 31 also tracks the bandwidth usage by traffic flowing through the router that utilizes unreserved resources (62). Router 31 may monitor traffic on outbound links 44 using a traffic analysis module 34 and generate traffic statistics based on the monitored traffic. Alternatively, router 31 may receive traffic statistics from an external traffic analysis module. RSVP-TE module 30A calculates the amount of bandwidth available on each of outbound links 44 using both reservation database 38 and the computed traffic statistics (64). In this manner, router 31 accounts for both the traffic usage of outbound links 44 not associated with reserved resources as well as the reserved bandwidth usage. During this process, router 31 generates bandwidth accounting information for links associated with passive interfaces (e.g., peering links associated with RSVP-passive interfaces) even though the interfaces do not support the Resource Reservation Protocol (RSVP). As a result, even though those links may not have any reserved bandwidth, the bandwidth availability information for those links accounts for current traffic associated with unreserved resources. The bandwidth availability information may, therefore, be useful in identifying and avoiding congested peering links.

Router 31 stores the calculated bandwidth availability information in TED 32 (66), and advertises the bandwidth availability information to other routers throughout the network (68). For example, router 31 may output routing communications that convey the bandwidth availability information in accordance with a link-state routing protocol, such as OSPF or IS-IS.

Figure 5:
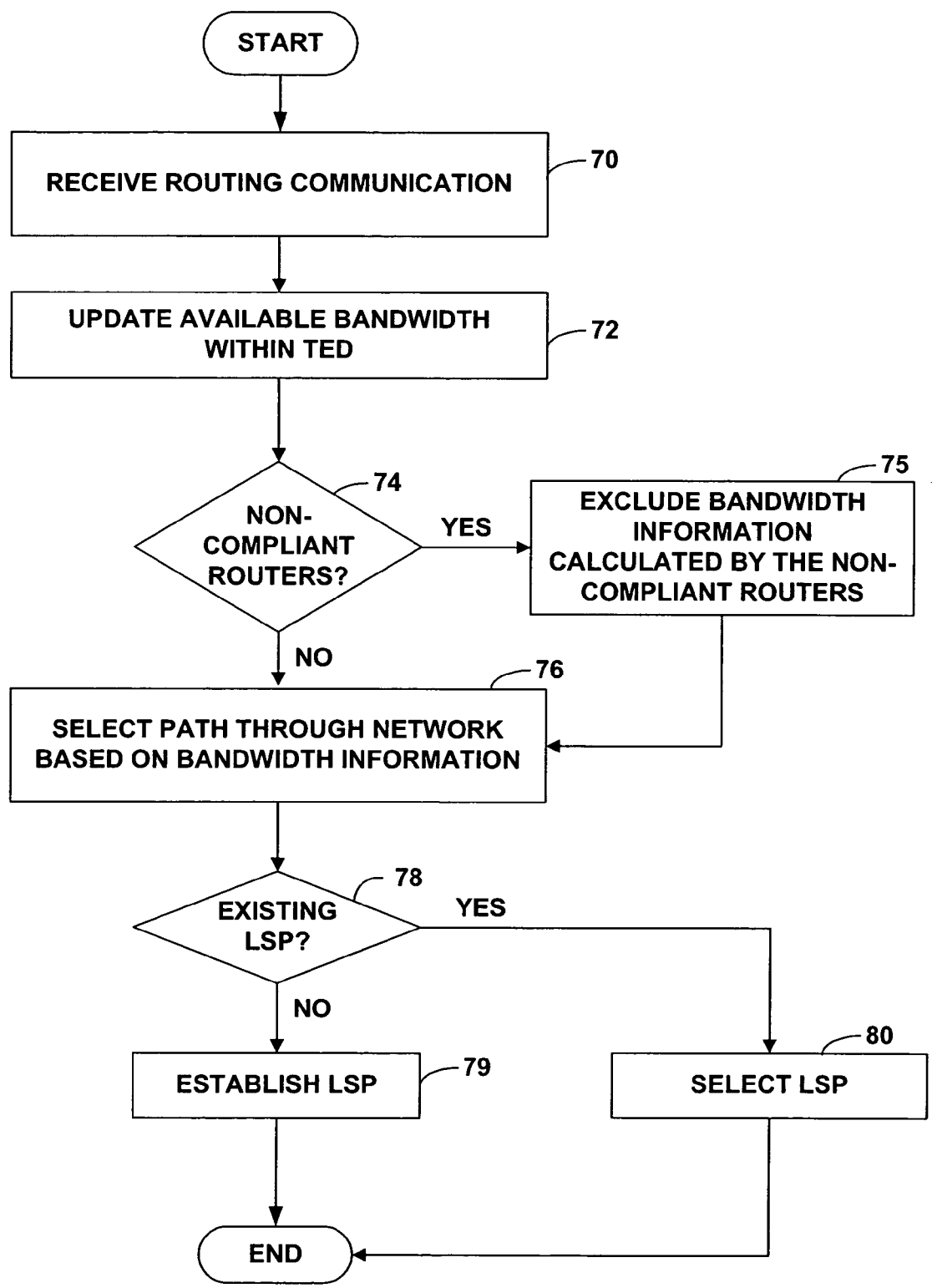
FIG. 5 is a flow diagram illustrating exemplary operation of a router that utilizes bandwidth availability information associated with peering links when selecting or establishing label switched paths (LSPs) to exits points of a network.

FIG. 5 is a flow chart illustrating exemplary operation of router, such as router 31 of FIG. 2, that accounts for bandwidth availability information for peering links when computing or establishing LSPs to exits of a network. On an ongoing basis, router 31 receives bandwidth availability information from other routers throughout the network (70) and updates TED 32 with the bandwidth availability information (72). As described above, routers within a network may exchange bandwidth availability information for links, such as peering links associated with passive interfaces, on an ongoing basis via a routing protocol or other mechanism suitable for exchanging such information.

Router 31 utilizes the bandwidth availability information for the links, including links associated with RSVP-passive interfaces, when performing path computation. As shown in FIG. 5, this process may be performed automatically upon receiving updated bandwidth availability information. In addition, the path computation process may be initiated in response to receiving a request for an LSP or manually by a system administrator.

In any case, CSPF module 36 (FIG. 2) initially accesses TED 32 to obtain bandwidth availability information, and determines whether any of the bandwidth availability information stored in TED 32 was calculated by a router that does not support passive interfaces or the extended bandwidth availability calculation that includes traffic associated with unreserved resources (74). If so, CSPF module 36 may exclude that bandwidth availability information from identifying a new path through the network (75). For example, CSPF module 36 may consider the amount of bandwidth available on any link associated with a router not supporting the techniques described herein to be zero, thereby removing the link from the path computation process.

Next, CSPF module 36 computes a path through the network based on the bandwidth availability information for links within the network as well as any peering links that have been associated with RSVP-passive interfaces (76). For example, CSPF module 36 computes the shortest path to an exit point in which each of the links along the path as well as the peering link associated with the exit point has sufficient available bandwidth.

RSVP-TE 30A determines whether an LSP exists along the computed path (78). If so, RSVP-TE 30A selects the LSP (80). Otherwise, RSVP-TE 30A establishes a new LSP along the identified path (79). In this manner, router 31 can avoid directing traffic along an LSP to an exit point of a network when the peering link associated with that exit point is congested.

Figure 6:
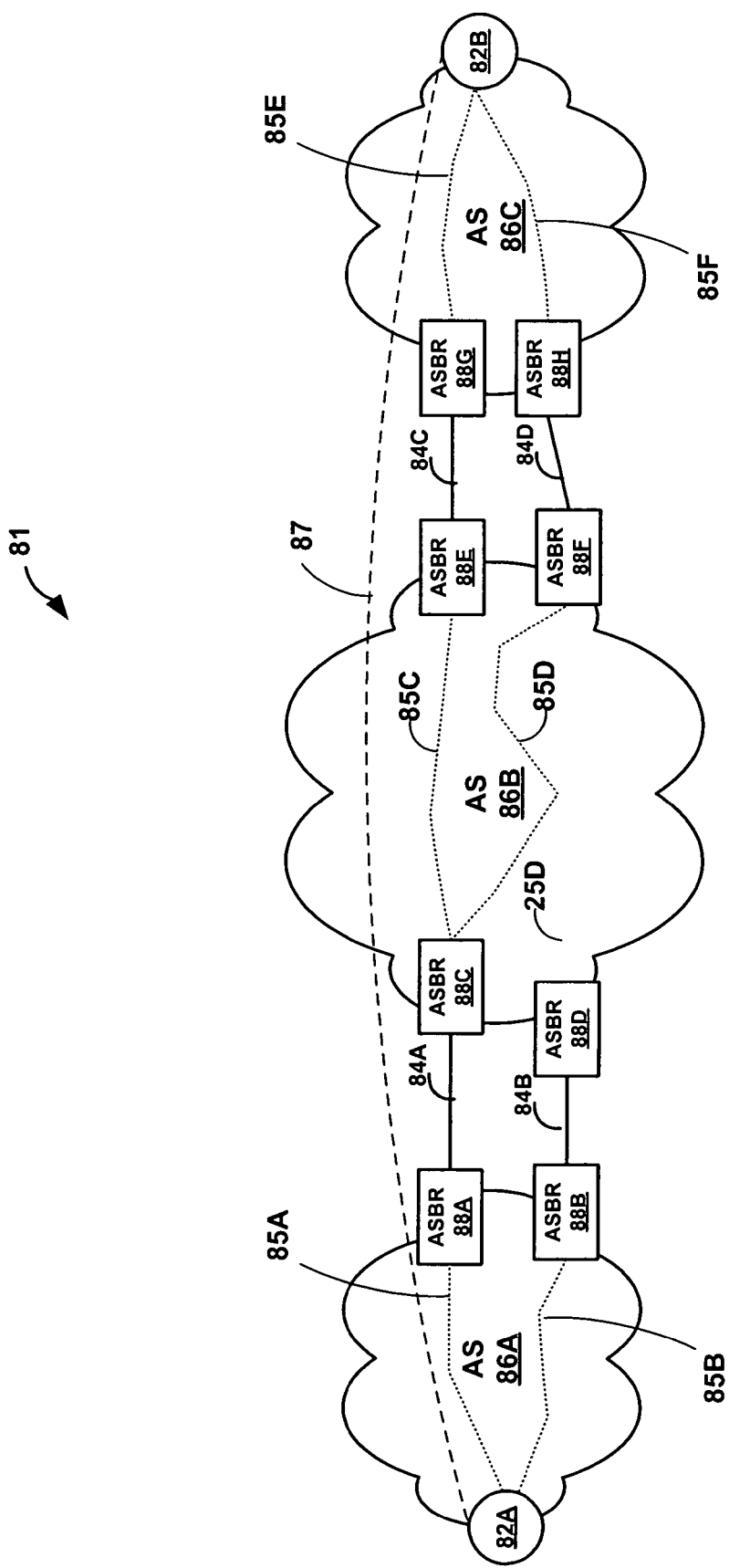
FIG. 6 is a block diagram illustrating an exemplary system that utilizes bandwidth availability information for peering links when selecting LSP segments to form an end-to-end LSP across multiple autonomous systems.

FIG. 6 is a block diagram illustrating an exemplary system 81 in which an inter-AS, end-to-end LSP 87 is traffic-engineered in accordance with the principles of the invention. In the example of FIG. 6, autonomous systems 86A-86C (collectively, "autonomous systems 86") are connected to one another by peering links 84A-84D (collectively, "peering links 84").

LSP 87 is established between nodes 82A and 82B in a manner that accounts for constraint information associated with each of peering links 84. In particular, inter-AS LSP segments 85A-85F (collectively, "LSP segments 85") are initially established. For example LSP segments 85A and 85B are established that span AS 86A. Similarly, LSP segments 85C and 85D are established within AS 86B, and LSP segments 85E and 85F are established within AS 86C. In this example, each LSP segments 85 spans a single AS. Moreover, the example of FIG. 6 is merely shown for exemplary purposes, and one or more LSP segments 85 may be established in each of autonomous systems 86.

In general, end-to-end LSP 87 is accomplished by "stitching" together several LSP segments 85. In particular, when establishing LSP 87, ASBRs 88A-88H (collectively, "ASBRs 88") apply the techniques described herein to select a subset of LSP segments 85 and peering links 84 that satisfy the bandwidth requirements associated with LSP 87.

However, RSVP-TE cannot be run end-to-end from node 82A to node 82B. In order to effectively traffic-engineer end-to-end LSP 87, ASBRs 88 must be aware of the bandwidth availability of peering links 84 as they identify a path from node 82A to node 82B with sufficient bandwidth available on each link. The selected LSP segments 85 are then stitched together to form end-to-end LSP 87 from nodes 82A to 82B. Techniques for stitching together LSP segments are further described in Ser. No. 10/963,412, entitled "AUTOMATIC LSP STITCHING WITH PROTOCOL SIGNALING" filed on Oct. 12, 2004, the entire content of which is incorporated herein by reference.

For example, ASBRs 88 may designate interfaces associated with peering links 84 as RSVP-passive interfaces. As a result, ASBRs 88 account for bandwidth availability on peering links 84 even though the interfaces associated with peering links 94 may not be configured to support RSVP-TE. ASBRs 88 share the bandwidth availability information via one or more routing protocols, such as a link-state IGP.

ASBRs 88 utilize the bandwidth availability information associated with peering links 84 when selecting the subset of LSP segments 85 to form end-to-end LSP 87. As one example, when responding to a request to establish LSP 87, ASBR 88C may apply the techniques to select between LSP segments 85C and 85D. In particular, ASBR 88C may utilize bandwidth availability information associated with peering links 84C and 84D to compute an appropriate path to an exit point for AS 86B. Based on the selected exit point (i.e., ASBR 88E or ASBR 88F), ASBR 88C selects LSP segment 85C or 85D for use in forming LSP 87. Alternatively, ASBR 88C may establish a new LSP segment in accordance with the computed path. In this manner, ASBRs 88 avoid congested peering links 84 when establishing end-to-end LSP 87.

Figure 7:
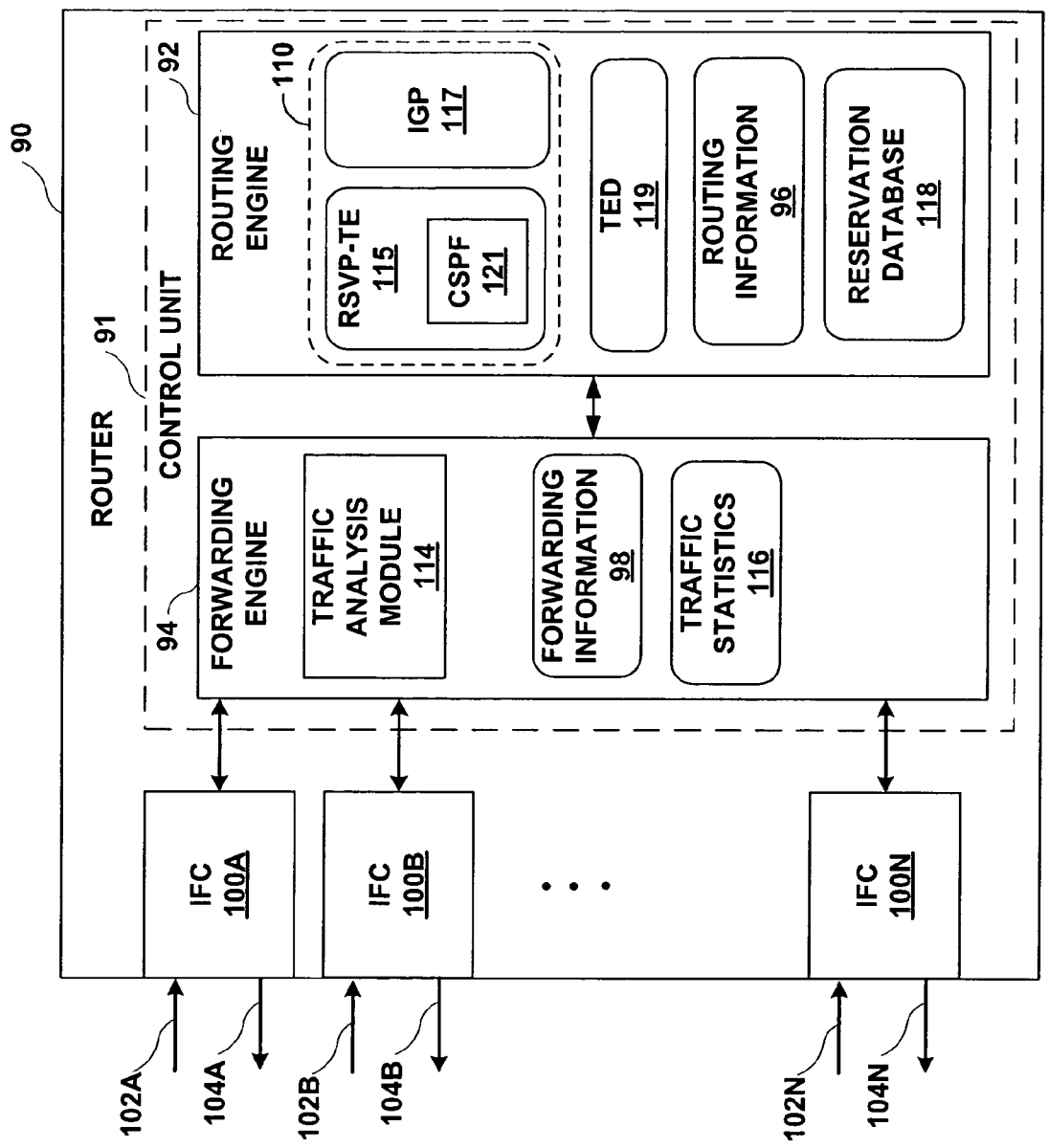
FIG. 7 is a block diagram illustrating another exemplary embodiment of a router in accordance with the principles of the invention.

FIG. 7 is a block diagram illustrating another exemplary router 90 in accordance with the principles of the invention. Router 90 conforms substantially to router 31 of FIG. 2, but router 90 includes a control unit 91 that comprises a routing engine 92 and a forwarding engine 94. Routing engine 92 is primarily responsible for maintaining routing information 96 to reflect the current topology of a network and other network entities to which it is connected. In particular, routing engine 92 updates routing information 96 to accurately reflect the topology of the network and other entities. In the example embodiment of FIG. 7, router 90 includes a set of interface cards (IFCs) 100A-100N (collectively, "IFCs 100") for communicating packets via inbound links 102A-102N (collectively, "inbound links 102") and outbound links 104A-104N (collectively, "outbound links 104").

In accordance with routing information 96, forwarding engine 94 maintains forwarding information 98 that associates network destinations with specific next hops and corresponding interfaces ports. Accordingly, forwarding engine 94 forwards packets received from inbound links 102A-102N to outbound links 104A-104N that correspond to next hops associated with destinations of the packets. In this manner, forwarding engine 94 provides the forwarding functionality of router 90. Forwarding engine 94 also includes traffic analysis module 114, which monitors the forwarded traffic and generates traffic statistics 116. Alternatively, traffic analysis module 114 may be implemented within routing engine 92, e.g., within RSVP-TE 115.

Protocols 110 execute within routing engine 92 to generate and maintain bandwidth availability information in TED 119, including bandwidth availability information for peering links. For example, RSVP-TE 115 records bandwidth reservations in reservation database 118, and calculates bandwidth availability for links in accordance with the reserved bandwidth and traffic statistics 116 for traffic associated with unreserved bandwidth. CSPF 121 utilizes the bandwidth availability information associated with peering links when computing paths to network exit points associated with the peering links. IGP 117 advertises the calculated bandwidth availability information in TED 119.

In one embodiment, each of forwarding engine 94 and routing engine 92 may comprise one or more dedicated processors, hardware, and/or computer-readable media storing instructions to perform the techniques described herein. Forwarding engine 94 and routing engine 92 may be communicatively coupled by a data communication channel. The data communication channel may be a high-speed network connection, bus, shared-memory or other data communication mechanism.

Figure 8:
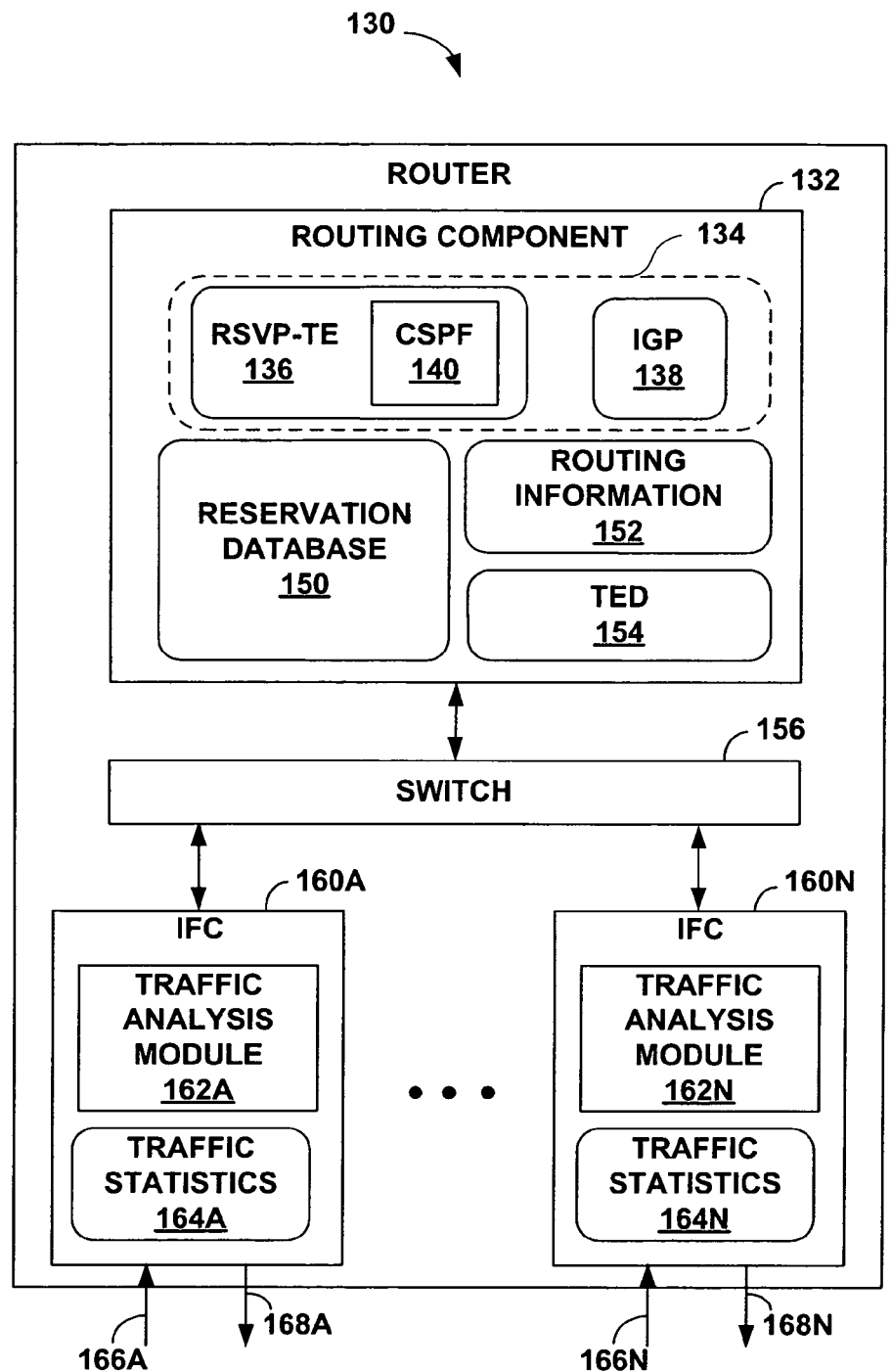
FIG. 8 is a block diagram illustrating yet another exemplary embodiment of a router in accordance with the principles of the invention.

FIG. 8 is a block diagram illustrating another exemplary router 130 in accordance with the invention. In general, router 130 conforms substantially to router 31 of FIG. 2. In the illustrated embodiment, router 130 includes interface cards (IFCs) 160A-160N ("IFCs 160") that are coupled to a routing component 132 via switch 156. Routing component 132 is primarily responsible for maintaining routing information 152 to reflect the current topology of a network and other network entities to which it is connected. IFCs 160 provide the forwarding functionality of router 130. Furthermore, IFCs 160 include traffic analysis modules 162A-162N ("traffic analysis modules 162") to maintain traffic statistics 164A-164N ("traffic statistics 164") for each of outbound links 168A-168N. In this manner, the functions of collection of traffic statistics 164 are distributed among IFCs 160.

Protocols 134 execute within routing component 132 to generate and maintain bandwidth availability information in TED 154, including bandwidth availability information for peering links. For example, RSVP-TE 136 records bandwidth reservations in reservation database 150, and calculates bandwidth availability for links in accordance with the reserved bandwidth and traffic statistics 164 computed by IFCs 160 for traffic associated with unreserved bandwidth. CSPF 140 utilizes the bandwidth availability information associated with peering links when computing paths to network exit points associated with the peering links. IGP 138 advertises the calculated bandwidth availability information in TED 154.

Various embodiments of the invention have been described. These and other embodiments are within the scope of the following claims.

The invention claimed is:

1. A method comprising:

designating an interface of a first network device associated with a peering link as a passive interface for which bandwidth reservations with a resource reservation protocol are unsupported, wherein the peering link couples the first network device within a first network to a second network device within a second network;

upon designating the interface as a passive interface, calculating, by executing the resource reservation protocol within the first network device, an amount of bandwidth available on the peering link; and outputting a communication from the first network device to communicate the amount of bandwidth available on the peering link to a third network device within the first network to allow the third network device to account for the amount of bandwidth available on the peering link when computing a path within the first network that terminates at an exit point of the first network associated with the peering link.

2. The method of claim 1, wherein outputting a communication comprises outputting a routing communication in accordance with a routing protocol, wherein the routing communication specifies the bandwidth availability information and includes data identifying the peering link as associated with a passive interface.

3. The method of claim 1, wherein outputting a communication comprises outputting the communication in accordance with a link-state protocol that specifies the amount of available bandwidth as link-state information associated with the link.

4. The method of claim 3, wherein the link-state protocol is an Interior Gateway Protocol (IGP).

5. The method of claim 4, wherein the IGP comprises the Open Shortest Path First (OSPF) protocol or the Intermediate System—Intermediate System (ISIS) protocol.

6. The method of claim 1, wherein calculating an amount of bandwidth comprises calculating the amount of bandwidth available on the peering link based on unreserved bandwidth utilized by traffic on the peering link.

7. The method of claim 1, wherein calculating an amount of bandwidth comprises:

averaging unreserved bandwidth utilized by traffic on the peering link over a period of time; and subtracting the average unreserved bandwidth usage by the traffic from a total capacity of the peering link.

8. The method of claim 1, wherein the resource reservation protocol comprises the Resource Reservation Protocol with Traffic Engineering extensions (RSVP-TE).

9. The method of claim 1, further comprising the third network device within the first network computing a path within the first network to an exit point associated with the peering link based on the amount of available bandwidth calculated for the peering link as well as the available bandwidth for links within the first network that support bandwidth reservations with the resource reservation protocol.

10. The method of claim 9, further comprising:
establishing a label switched path (LSP) in accordance with the computed path; and
directing packets from the LSP to the peering link.

11. The method of claim 9, further comprising:
executing a routing protocol within the third network device to receive the routing protocol communication from the first network device.

12. The method of claim 11, wherein executing a routing protocol comprises executing an Interior Gateway Protocol (IGP).

13. The method of claim 12, wherein the IGP comprises the Open Shortest Path First (OSPF) protocol or the Intermediate System—Intermediate System (ISIS) protocol.

14. The method of claim 9, further comprising selecting one of a plurality of established label switched paths in accordance with the computed path.

15. The method of claim 9, wherein computing a path comprises executing a constrained shorted path first (CSPF) algorithm that utilizes the constraint information for the peering link to compute the path within the first network.

16. The method of claim 9, wherein computing a path comprises:
computing a path to the exit point when the bandwidth availability for the peering link satisfies a requested amount of bandwidth; and
computing a path to a different exit point of the first network when the bandwidth availability for the peering link fails to satisfy the requested amount of bandwidth.

17. The method of claim 9, wherein computing a path comprises:
invoking an offline software tool to compute the path based on the amount of bandwidth available; and
manually establishing an LSP in accordance with the path computed by the offline software tool.

18. The method of claim 9, further comprising receiving, at the third network device, a routing communication from the first network device designating the interface associated with the peering link as a passive interface.

19. The method of claim 9, further comprising the third network device computing the path based on the amount of bandwidth available when the interface is designated as a passive interface.

20. The method of claim 9, further comprising:
establishing an LSP segment in accordance with the computed path; and
stitching the LSP segment with other LSP segments to form an end-to-end LSP across multiple networks.

21. The method of claim 9, further comprising:
selecting one of a plurality of LSP segments within the first network in accordance with the computed path; and
stitching the selected LSP segment with LSP segments of other networks to form an LSP through the networks.

22. The method of claim 1, wherein the communication communicates constraint information that comprises one or more of administrative attributes, or priorities for label switched paths (LSPs).

23. A device comprising:
a resource reservation protocol executing within a control unit to collect constraint information associated with a peering link for which reservation requests are unsupported, wherein the peering link couples the network device within a first network to a second network device within a second network;
an interface associated with the peering link, wherein the resource reservation protocol designates the interface as a passive interface; and
a routing protocol executing within the control unit to communicate the constraint information associated with the peering link to other devices of a network to allow the other network devices to account for the amount of bandwidth available on the peering link when computing a path within the first network that terminates at an exit point of the first network associated with the peering link.

24. The device of claim 23, wherein the routing protocol outputs a routing communication in accordance with a routing protocol, wherein the routing communication specifies the constraint information for the peering link.

25. The device of claim 23, wherein the routing protocol outputs a routing communication that specifies the constraint information for the peering link and associates the peering link with a passive interface.

26. The device of claim 23, wherein the constraint information comprises bandwidth availability information.

27. The device of claim 23, wherein the constraint information comprises one or more of bandwidth information, administrative attributes, or priorities for label switched paths (LSPs).

28. The device of claim 23, wherein the routing protocol comprises an Interior Gateway Protocol (IGP) and advertises the constraint information as link-state information associated with the peering link.

29. The device of claim 28, wherein the IGP comprises the Open Shortest Path First (OSPF) protocol or the Intermediate System—Intermediate System (ISIS) protocol.

30. The device of claim 23, further comprising:
a traffic analysis module to calculate an amount of bandwidth available for the peering link; and
a traffic engineering data structure to store the amount of available bandwidth,
wherein the routing protocol communicates to the other routers the amount of available bandwidth as the constraint information.

31. The device of claim 30, wherein the traffic analysis module calculates the amount of bandwidth available on the peering link based on unreserved bandwidth utilized by traffic on the peering link.

32. The device of claim 31, wherein the traffic includes label distribution protocol (LDP) traffic or internet protocol (IP) traffic.

33. The device of claim 23, wherein the resource reservation protocol comprises the Resource Reservation Protocol with Traffic Engineering extensions (RSVP-TE).

34. A computer-readable medium comprising executable instructions for causing a network device to:
execute a resource reservation protocol that designates an interface associated with a peering link as a passive interface for which the resource reservation protocol is unsupported, wherein the resource reservation protocol calculates constraint information for the peering link, and wherein the peering link couples the network device within a first network to a second network device within a second network; and execute a routing protocol that outputs a routing protocol communication to communicate the constraint information to a third network device within the first network to allow the third network device to account for the amount of bandwidth available on the peering link when computing a path within the first network that terminates at an exit point of the first network associated with the peering link.

35. The computer-readable medium of claim 34, wherein the constraint information comprises bandwidth information.

36. A system comprising:
a first network;
a second network coupled to the first network by a peering link for which reservation requests for a resource reservation protocol are unsupported;
a first network device located at an exit point of the first network coupled to the peering link, wherein the first network device comprises the resource reservation protocol executing within a control unit of the first network device to collect constraint information associated with the peering link, and a routing protocol executing within the control unit of the first network to communicate the constraint information to a second network device located within the first network,
wherein the second network device comprises the resource reservation protocol and the routing protocol executing within a control unit of the second network device,
wherein the routing protocol executing within the second network device receives the constraint information associated with the peering link from the first network device and computes a path that terminates within the first network based on the constraint information for the peering link, and
wherein the resource reservation protocol executing within the second network device establishes a label switched path (LSP) in accordance with the computed path and directs packets along the LSP to the peering link.

37. The system of claim 36, wherein the first network and the second network are under the control of different administrative entities.

38. A method for establishing a label switched path (LSP) through a network, the method comprising:
on a network device having an interface to a peering link providing a first one of a plurality of exit points of the network, calculating an amount of bandwidth available on the peering link;
computing a label switched path (LSP) within the first network to the exit point provided by the peering link using a Multi-Protocol Label Switching (MPLS) resource reservation protocol, wherein the MPLS resource reservation protocol is unsupported over the peering link, and wherein computing the LSP within the first network includes selecting a path through the network for the LSP and terminating at the exit point provided by the peering link based on bandwidth information for links within the network that support the MPLS resource reservation protocol as well as the calculated amount of bandwidth available the peering link that does not support the MPLS resource reservation protocol;
in accordance with the computed path, establishing the LSP within the network to terminate at the exit point provided by the peering link; and
directing packets along the LSP to the peering link.

\* \* \* \* \*